United States Patent
Grochocinski et al.

(10) Patent No.: US 6,519,079 B1
(45) Date of Patent: Feb. 11, 2003

(54) OPTICAL FIBER AMPLIFIER WITH REDUCED NOISE AND METHOD OF MAKING THE SAME

(75) Inventors: James M. Grochocinski, Upton Chester (GB); Stuart Gray, Corning, NY (US); Jason E. Hurley, Corning, NY (US); Gary A. Ribble, Sr., Bath, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/967,395

(22) Filed: Sep. 28, 2001

(51) Int. Cl.[7] .................................................. H01S 3/00

(52) U.S. Cl. ...................................... 359/337; 359/334

(58) Field of Search .................................. 359/337, 334

(56) References Cited

U.S. PATENT DOCUMENTS 6,266,180 B1 * 7/2001 Inagaki et al. .............. 359/337
6,437,906 B1 * 8/2002 Di Pasquale et al. .... 359/337.2

OTHER PUBLICATIONS

Matera et al, "Reduction of the Cross–Phase Modulation Impairment in wavelength division Multipled Systems With Dispersion Management" (1999), CLEO 99, pp 306 and 307.*
Song et al, "Effects of SPM, XPM, and Four–Wave–Mixing in L–Band EDFAs on Fiber–Optic Signal Transmission" (2000), IEEE Photonics Technology Letters, vol. 12, No. 12, pp 1630–1632.*
*Raman Amplification in the All–Optical Network*, Americas Telecommunications, Jun. 2001.
*Dispersion*, Fiber Optics Glossary.
*Fiber Amplifier*, Definition.
*Example 17: Raman Amplifier* .

* cited by examiner

*Primary Examiner*—Mark Hellner
(74) *Attorney, Agent, or Firm*—Svetlana Z. Short; Thomas W. Cole

(57) ABSTRACT

A method for amplifying optical signals and an optical fiber amplifier for accomplishing the same. An optical fiber is coupled to a source of pump light and a signal gain level is correlated to a dispersion value of the optical fiber that corresponds to a local minimum power level of a cross-talk signal generated by four wave mixing. Optical signals are transmitted through the optical fiber while admitting sufficient pump light into the fiber from the source to attain the selected Raman gain level.

23 Claims, 2 Drawing Sheets

— G = 0 dB   – – G = 5 dB
— G = 10 dB  ----- G = 15 dB

- ◆ NO GAIN
- ■ 10dB GAIN
-   14dB GAIN
- × 18dB GAIN

OPTICAL FIBER AMPLIFIER WITH REDUCED NOISE AND METHOD OF MAKING THE SAME

FIELD OF THE INVENTION

This invention generally concerns optical amplifiers, and is particularly concerned with a method of operating a Raman-type amplifier to reduce noise generated by four-wave mixing.

BACKGROUND

Optical amplifiers for amplifying photonic signals transmitted through optical fiber networks are well known in the art. Such amplifiers are used to extend transmission distances and to compensate for losses from various network elements. Presently, there are two known types of optical amplifiers, including erbium-doped fiber amplifiers (EDFAs), and Raman amplifiers.

EDFAs typically comprise a pump laser whose output is optically coupled to the input of two or more serially connected coils of erbium-doped optical fiber. In operation, the output of the pump laser excites the atoms of the erbium-dopant within the serial connected coils. These excited atoms release their excess energy in proportion to the strength of the incoming optical signal, which results in an amplified output. By contrast, Raman amplifiers achieve amplification without the need for specially erbium-doped optical fibers; fibers with conventional dopants may be used.

In such an amplifier, the output of a pair of orthogonally polarized pump-diode lasers provide backward propagating pump power in the gain fiber. Forward-propagating signals achieve gain in the fiber because higher energy (shorter wavelength) pump photons scatter off the vibrational modes of the fiber's lattice matrix and coherently add to the lower-energy (longer wavelength) signal photons.

Raman amplifiers may be one of two types, depending upon the source of the gain fiber used therein. Distributed Raman amplifiers advantageously use the transmission fiber itself as the gain fiber. By contrast, discrete Raman amplifiers employ their own gain fiber which is added to the transmission fiber of the network. While the dopant used in the gain fiber of a discrete Raman amplifier is typically the same as used in the transmission fiber (i.e., germanium), the Raman gain fiber is usually doped with higher concentrations of germanium than conventional transmission fiber and is designed to operate with a decreased fiber effective area in order to provide a high non-linear coefficient to the resulting gain fiber. The resulting reduction in non-linear properties of the fiber allows the gain fiber to transmit at a higher bandwidth.

Unfortunately, the high concentration of dopant in combination with the decreased fiber effective area does not eliminate all non-linearities, and makes such discrete Raman amplifiers more vulnerable to a type of noise known as four-wave mixing (FWM). FWM can occur when two or more frequencies of light propagate through an optical fiber together because of nonlinear susceptibilities of the optical fiber. As a result of FWM, light is generated at new frequencies using optical power from the original signals. The end result is an interfering tone in the optical signal being transmitted. Generation of such light through FWM has negative implications in communications systems because the generated light is noise with respect to the communications signal and the power of the communications signal is reduced. Accordingly, the signal to noise ratio can be greatly reduced by FWM phenomenon. It is therefore desirable to reduce the effects of FWM in fiber amplifiers.

SUMMARY OF THE INVENTION

It is an object of the invention to reduce noise and increase performance of fiber amplifiers. To achieve this and other objects, a first aspect of the invention is a method for amplifying optical signals with a Raman amplifier of the type having an optical fiber coupled to a source of pump light comprising the steps of correlating a signal gain level to a dispersion value of the optical fiber that corresponds to a local minimum power level of a cross-talk signal generated by four wave mixing, and transmitting the optical signals through the optical fiber while admitting sufficient pump light into the fiber from the source to attain the selected Raman gain level.

A second aspect of the invention is a fiber amplifier, comprising a source of pump light at an intensity corresponding to a selected gain level, and a gain fiber coupled to the source of pump light and having an input end and an output end for receiving and transmitting optical signals. A dispersion value of the gain fiber corresponds to a local minimum power level of a cross-talk signal generated by four wave mixing at the selected gain level.

BRIEF DESCRIPTION OF THE DRAWING

The invention will be described through a preferred embodiment and the attached drawing in which.

DETAILED DESCRIPTION OF THE PREFERRED EMBODIMENT

Figure 1:
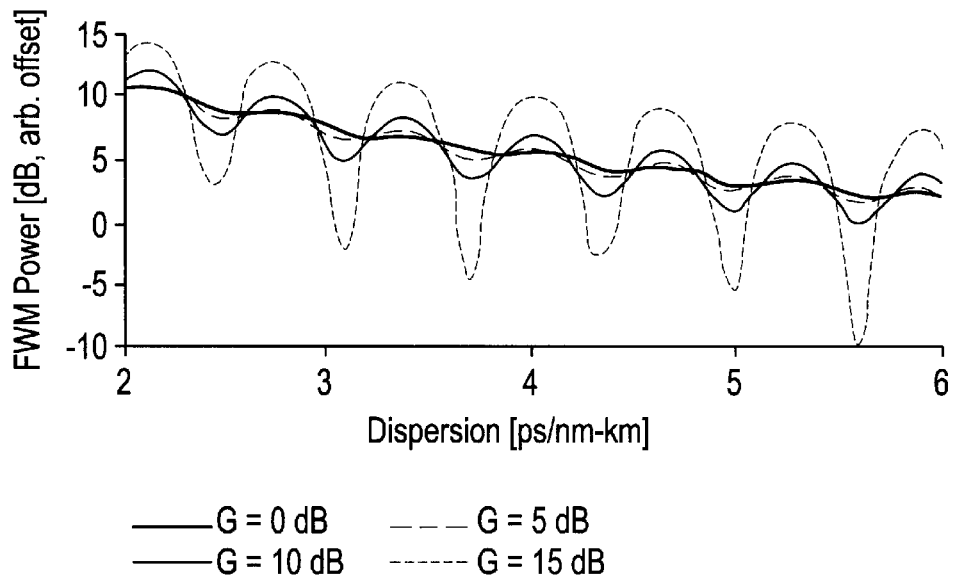
FIG. 1 is a graph showing the relationship between the power of FWM interference with the dispersion coefficient of the fiber.

Since the use of a fiber amplifier increases the total power of light in a span, the magnitude of nonlinear effects might be expected to increase with increasing Raman amplification. However, the amount of four wave mixing occurring in a particular transmission is dependent on the location along the fiber. Applicants have discovered that FWM has an oscillatory component in fiber amplifiers because attenuation in a fiber amplifier varies with position. The oscillatory component of FWM in fiber amplifiers creates an effect in which the power of FWM noise can actually decrease with an increase in Raman gain due to cancellation between the high power regions at the beginning and end of the span. Applicant has further discovered a critical relationship between dispersion of the fiber amplifier and the signal gain level in the fiber amplifier that can be used to reduce noise due to FWM. The novel mathematical analysis which led to these discoveries is set forth as follows:

The FWM process in optical fibers is usually characterized by a FWM efficiency defined in [3]. In this description, the FWM efficiency $\eta$ assumes that the attenuation of the signals $\alpha$ is independent of position z. As such, this theory cannot be applied to the FWM interactions that can occur in an optical amplifier where the attentuation or gan of a signal is position dependent.

By assuming that the attenuation can vary as a function of a position we derive a new expression for the FWM efficiency for general $\alpha(z)$ which is related as $$\eta = \left|\frac{\eta'}{L_{eff}}\right|^2 : \quad [1]$$

$$\eta' = \int_0^L \exp\left[-\int_0^z \alpha(z')dz' + i\Delta\beta z\right]dz.$$

In (1) L is the length of the span and $$\Delta\beta = \beta_i + \beta_j - \beta_k - \beta_{ijk}$$

is the propagation constant difference between the channels and FWM tone generated. The power in a FWM tone is proportional to $|\eta'|^2$.

For backward pumped Raman amplifiers the gain can be modeled as an effective negative attenuation. When channel to channel Raman effects and pump depletion are both assumed negligible, then the effective attenuation of the Raman gain is an exponential function of distance times pump attenuation [4]. With $\alpha_s$ and $\alpha_p$ representing the intrinsic signal and pump attenuations, respectively, the expression in [1] becomes $$\eta' = \int_0^L \exp\left[-\alpha_s z + G \frac{\exp(\alpha_p z) - 1}{\exp(\alpha_p L) - 1} + i\Delta\beta z\right]dz, \quad [2]$$

where G is the Raman pump on/off gain, where $e^G$ is the linear gain and $10G/\ln(10)$ is the gain in dB. When G=0, this integral is trivial and the FWM efficiency presented in [3] is reproduced. For the general case an accurate approximation to this integral has been derived. First define effective attenuations at span and start and end:

$$\alpha_i = \alpha_s - G \frac{\alpha_p}{\exp(\alpha_p L) - 1}; \quad \alpha_f = \alpha_s - G \frac{\alpha_p \exp(\alpha_p L)}{\exp(\alpha_p L) - 1}. \quad [3]$$

Provided that $\Delta\beta \gg a_i$, $\Delta\beta \gg a_f$, and $\Delta\beta L \gg 1$ then $$\eta' = \frac{1}{\alpha_a - i\Delta\beta} - \frac{esp[-\alpha_s L + G + i\Delta\beta L]}{\alpha_f - i\Delta\beta} + \frac{a_p(\alpha_s - \alpha_i)}{(\alpha_i - i\Delta\beta)^3} - \quad [4]$$

$$\exp[-\alpha_s L + G + i\Delta\beta L]\frac{a_p(\alpha_s - \alpha_f)}{(\alpha_f - i\Delta\beta)^3}$$

is an accurate approximation to the integral expression (2). For sufficiently large $\Delta\beta$ the first two terms are enough.

Since Raman amplification increases the total power in a span the magnitude of nonlinear effects might be expected to increase with increasing Raman gain. However, due to the oscillatory nature of the integrand in (2) the power in a FWM tone can decrease with Raman gain. Cancellation between the high power regions at the beginning and end of the span explains this counter-intuitive results. FIG. 1 shows the degenerate FWM power created by two channels for different amounts of Raman gain. In this example the FWM power can increase by more than 5 dβ at Raman gain of 15 dβ.

Figure 2:
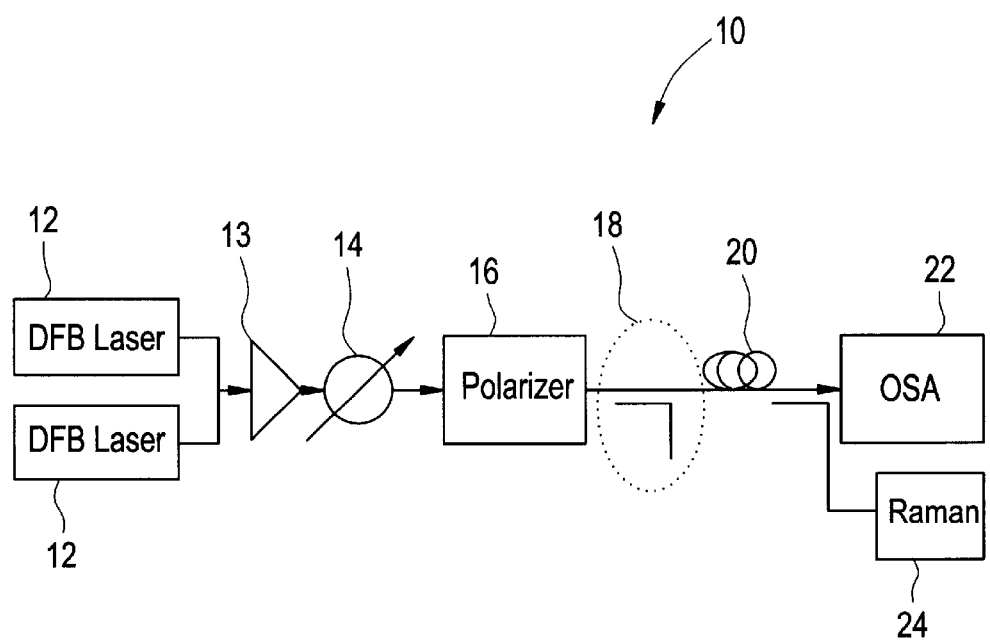
FIG. 2 is a schematic illustration of a test apparatus of the preferred embodiment.

FIG. 2 illustrates a test apparatus 10 for determining the relationship between dispersion, signal gain, and noise due to FWM in a fiber amplifier in accordance with a preferred embodiment. Two distributed fiber bragg (DFB) laser sources 12 are multiplexed together the output thereof is coupled to optical fiber 20 through erbium doped fiber amplifier (EDFA) 13, variable optical attenuator 14, polarizer 16, and 1% tap coupler 18. Raman gain can be generated by pumping optical fiber 20 with the output of Raman pump module 24. The power of FWM tones generated by the two light signals can be measured with optical spectrum analyzer (OSA) 22 coupled to an output of fiber 20.

Figure 3:
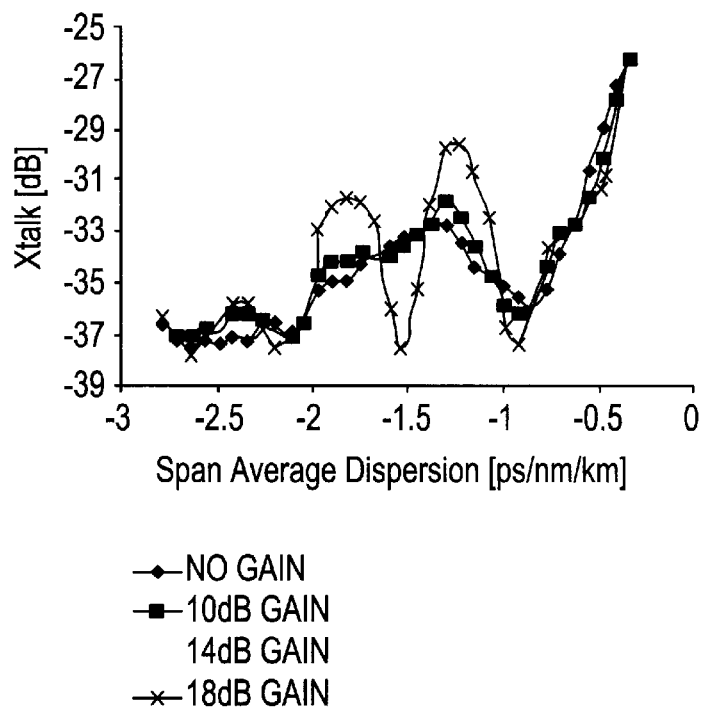
FIG. 3 is a graph of test results using the apparatus of FIG. 2.

In an experiment, a signal power of +3 dBm was launched in each channel and the FWM power was measured and recorded for Raman gains of 0, 10, 14, and 18 dB, by incrementally adjusting Raman pump module 24. For each value of Raman gain, laser sources 12 were tuned in 1 nm increments to change the dispersion value in fiber 20 and thus permit determination of FWM behavior as a function of dispersion. FIG. 2 illustrates the results of the above-noted experiment. In FIG. 3, cross-talk from four wave mixing is plotted as a function of fiber dispersion for each Raman gain. With no Raman gain, i.e. 0 dB, in the transmission fiber, the trend of the cross-talk decreases as the magnitude of dispersion increases. However, as Raman gain is increased, the cross-talk exhibits a larger and larger sinusoidal dependence on dispersion to generate localized maxima and minima of cross-talk as a function of dispersion of fiber 20. The maxima and minima occur at substantially the same dispersion values, i.e. the same signal wavelengths, regardless of the Raman gain. However, it can be seen that as Raman gain increases, the relative values of the maxima and minima also increase.

Prior to applicant's discovery of this sinusoidal dependence, it would have been expected that increasing power in the signal would result in an increase in cross-talk due to FWM. However, it can be seen that if dispersion values are selected correctly, there can actually be a reduction in cross-talk when the signal power is increased. This discovery permits selection of system parameters that minimize cross-talk due to FWM. In particular, if fiber characteristics are selected so that the dispersion value in a particular system will be within a range that substantially corresponds to a localized minima, an increase in Raman gain will create a reduction in cross-talk. Accordingly, cross-talk can be minimized by properly selecting the fiber in context of the overall system to provide the desired dispersion value.

Figure 4:
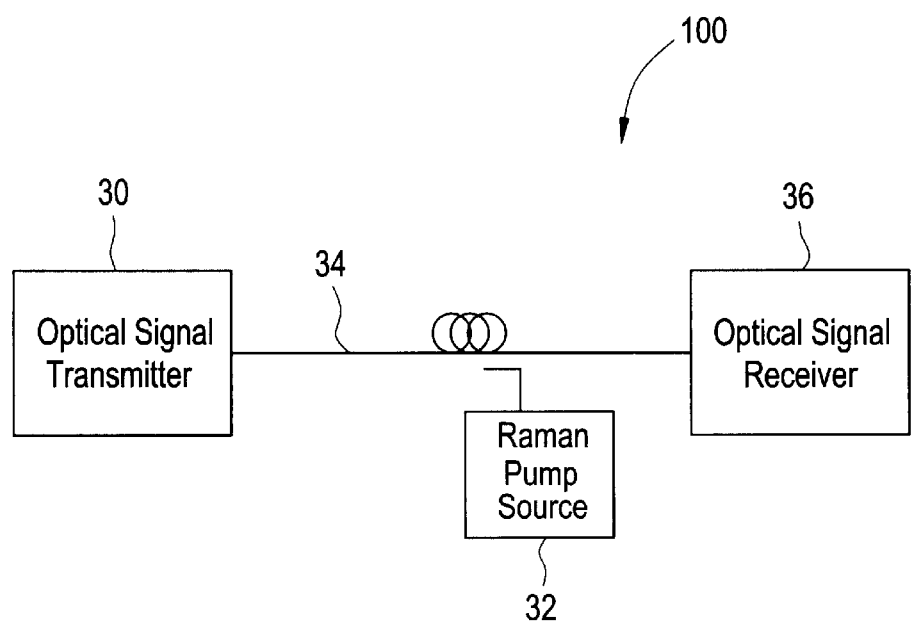
FIG. 4 is a block diagram of a transmission circuit utilizing a Raman amplifier in accordance with a preferred embodiment of the invention.

FIG. 4 illustrates optical signal transmission system 100 utilizing a fiber amplifier in accordance with the invention. Optical signal transmitter 30 is coupled to optical signal receiver 36 by optical fiber 34 as a transmission fiber. Raman pump source introduces pump light into fiber 34 to achieve Raman amplification. The gain level of the signal transmitted through fiber 34 is correlated to the dispersion value of fiber 32 that corresponds to a local minimum power level of a cross-talk signal generated by four wave mixing as described above.

Improved amplification of optical signals can be achieved by correlating a signal gain level to a dispersion value of the optical fiber used for carrying the signal so that the dispersion value corresponds substantially to a local minimum power level of a cross-talk signal generated by four wave mixing. The signal can be transmitted through the optical fiber while admitting sufficient pump light into the optical fiber from a source to attain the selected level of Raman gain. Of course, the optical fiber can be a transmission fiber that provides Raman gain when pumped with the light.

The above-noted correlating can be achieved by selecting a desired level of Raman gain and then selecting an optical fiber to provide the Raman gain such that the optical fiber has a dispersion value that corresponds to the localized minimum power level of the cross-talk signal. The correlation can also be achieved by adjusting the signal gain based on the dispersion value of the fiber to be a value that corresponds to the localized minimum power level of the cross-talk signal. The cross-talk can be a signal generated by four level mixing or other phenomenon.

The optical signal can be transmitted at plural wavelengths and any portions of the fiber can provide Raman gain. Preferably the optical signals are in the range of 960–1600 nm and more preferably in the range of 1300 to 1650 nm. Preferably, the fiber is dispersion flattened. The fiber can be doped as needed but preferably is not doped with a rare earth element. The gain level can be of any value and preferably is at least 10 dB. The selected dispersion value can be any value and preferably is in one of the following ranges, the absolute value of 1–8 ps/nm/km, −10 to −100 ps/nm/km, or 15 to 20 ps/nm/km.

The invention can be applied to any type of Raman amplifier, such as single channel amplifiers or multiple channel amplifiers. The transmitted signal can be of any type and can be for any application.

The invention has been describe through a preferred embodiment. However, various modifications can be made without departing from the scope of the invention as defined by the appended claims and legal equivalents.

PARTS LIST

10. Test apparatus
12. Lase sources
13. EDFA
14. Optical attenuator
16. Polarizer
18. Tap coupler
20. Optical fiber
22. OSA
24. Pump module
30. Optical signal transmitter
32. Fiber
34. Optical fiber
36. Optical signal receiver

What is claimed:

1. A method for amplifying optical signals with a fiber amplifier of the type having an optical fiber coupled to a source of pump light comprising the steps of:

correlating a signal gain level to a dispersion value of said optical fiber that corresponds to a local minimum power level of a cross-talk signal generated by four wave mixing, and transmitting said optical signals through said optical fiber while admitting sufficient pump light into said fiber from said source to attain said signal gain level.

2. The method for amplifying optical signals according to claim 1, wherein said optical fiber is a transmission fiber that provides gain when pumped with said pump light.

3. The method for amplifying optical signals according to claim 1, wherein said correlation step comprises selecting a Raman gain level, and then selecting said optical fiber to provide Raman gain such that said optical fiber has a dispersion value that corresponds to said local minimum power level of said cross-talk signal.

4. The method for amplifying optical signals according to claim 1, wherein said correlation step is implemented by the step of adjusting the signal gain level to the dispersion value of said optical fiber to a value that corresponds to said local minimum power level of said cross-talk signal.

5. The method for amplifying optical signals according to claim 1, wherein said optical signals are transmitted over a selected wavelength, and said dispersion value corresponds to a local minimum power level of a cross-talk signal generated by four wave mixing at said selected wavelength.

6. The method for amplifying optical signals according to claim 1, wherein said optical signals are transmitted over a plurality of wavelengths, and at least portions of said optical fiber provide Raman gain and is dispersion flattened.

7. The method for amplifying optical signals according to claim 1, wherein said gain level is at least 10 dB.

8. The method for amplifying optical signals according to claim 1, wherein said dispersion value is between about |1 to 8| ps/nm/km.

9. The method for amplifying optical signals according to claim 1, wherein said dispersion value is between about −10 and −100 ps/nm/km.

10. The method for amplifying optical signals according to claim 6, wherein said selected dispersion value is between about 15 and 20 ps/nm/km.

11. The method for amplifying optical signals according to claim 1, wherein said optical signals are transmitted at wavelengths between about 950 and 1650 nm.

12. The method for amplifying optical signals according to claim 11, wherein said wavelengths are between about 1300 and 1650 nm.

13. The method for amplifying optical signals according to claim 8, wherein said optical signals are transmitted at wavelengths between about 1500 and 1600 nm.

14. A optical fiber amplifier, comprising:

a source of pump light at an intensity corresponding to a selected gain level, and a gain fiber coupled to said source of pump light and having an input end and an output end for receiving and transmitting optical signals, wherein a dispersion value of the gain fiber corresponds to a local minimum power level of a cross-talk signal generated by four wave mixing at said selected gain level.

15. The optical fiber amplifier according to claim 14 wherein said gain fiber is a transmission fiber.

16. The optical fiber amplifier according to claim 15 where in s aid transmission fiber is not doped with a rare earth element.

17. The optical fiber amplifier according to claim 14, wherein said source of pump light includes a controller for adjusting the intensity of said light.

18. The optical fiber amplifier according to claim 14, wherein said gain fiber is a dispersion flattened fiber.

19. The optical fiber amplifier according to claim 14, further comprising a dispersion compensating module for adjusting an average dispersion value of said gain fiber.

20. The optical fiber amplifier according to claim 14, wherein said selected dispersion value is between about −10 and −100 ps/nm/km.

21. The optical fiber amplifier according to claim 14 wherein said selected dispersion value is between about 15 and 20 ps/nm/nm/km.

22. The optical fiber amplifier according to claim 14 wherein said selected dispersion value is between about |1 and 8| ps/nm/km.

23. The optical fiber amplifier according to claim 18, wherein said amplifier is a multi-channel amplifier.

* * * * *

UNITED STATES PATENT AND TRADEMARK OFFICE
CERTIFICATE OF CORRECTION

PATENT NO. : 6,519,079 B1
DATED : February 11, 2003
INVENTOR(S) : Grochocinski et al.

It is certified that error appears in the above-identified patent and that said Letters Patent is hereby corrected as shown below:

<u>Column 6,</u>
Line 43, insert -- wherein said transmission fiber is not doped with a rare -- instead of "where in s aid transmission fiber is not doped with a rare"
Line 58, insert -- pm/nm/km -- instead of "pm/nm/nm/km"

Signed and Sealed this

Third Day of February, 2004

JON W. DUDAS
*Acting Director of the United States Patent and Trademark Office*